(12) United States Patent
Stevens

(10) Patent No.: US 8,200,918 B2
(45) Date of Patent: Jun. 12, 2012

(54) TRACKING OWNERSHIP OF MEMORY IN A DATA PROCESSING SYSTEM THROUGH USE OF A MEMORY MONITOR

(75) Inventor: Jerry W. Stevens, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2051 days.

(21) Appl. No.: 10/956,840

(22) Filed: Oct. 1, 2004

(65) Prior Publication Data

US 2006/0075195 A1    Apr. 6, 2006

(51) Int. Cl.
*G06F 12/00* (2006.01)
*G06F 13/00* (2006.01)

(52) U.S. Cl. .................. 711/156; 711/100; 711/154

(58) Field of Classification Search .................. 711/100, 711/154, 156
See application file for complete search history.

(56) References Cited

U.S. PATENT DOCUMENTS

| 5,909,553 A | 6/1999 | Campbell et al. ........ 395/200.66 |
| 5,920,703 A | 7/1999 | Campbell et al. ........ 395/200.66 |
| 2003/0028738 A1 | 2/2003 | Iyengar et al. ................ 711/170 |

OTHER PUBLICATIONS

Jerry Peek et al., UNIX Power Tools, Aug. 1997, O'Reilly & Associates, Inc., Second edition, ISBN 1-56592-260-3.*
David Tansley, LINUX and UNIX Shell Programming, 2000, Addison-Wesley, ISBN 0-201-67472-6.*
Microsoft, Microsoft Computer Dictionary, 2002, Microsoft Press, 5th Edition, ISBN: 0/7356-1495-4, pp. 181 & 238.*

* cited by examiner

*Primary Examiner* — Tuan V. Thai
(74) *Attorney, Agent, or Firm* — Cuenot, Forsythe & Kim, LLC

(57) ABSTRACT

Ownership of a memory unit in a data processing system is tracked by assigning an identifier to each software component in the data processing system that can acquire ownership of the memory unit. An ownership variable is updated with the identifier of the software component that acquires ownership of the memory unit whenever the memory unit is acquired.

14 Claims, 3 Drawing Sheets

TRACKING OWNERSHIP OF MEMORY IN A DATA PROCESSING SYSTEM THROUGH USE OF A MEMORY MONITOR

BACKGROUND OF THE INVENTION

The present invention relates to data processing methods, systems, and computer program products, and, more particularly, to data processing methods, systems, and computer program products for tracking ownership of a memory unit (s).

Conventional operating systems, such as the z/OS operating system provided by IBM Corporation, Armonk, N.Y., may use a subsystem to handle communication processing. For example, the z/OS operating system includes a subsystem called the Communications Server (CS), which includes a storage manager subsystem called the Common Storage Manager (CSM) for use by Systems Network Architecture (SNA) and/or TCP/IP protocol stacks to perform input/output (I/O) operations.

One purpose of the CSM is to reduce or avoid data moves within the operating system image while performing I/O operations. For example, during large data operations, such as file transfers, instead of copying data buffers, the same buffers or storage may be shared by various subsystems and/or components within subsystems. The various subsystems/components may pass tokens to represent current ownership of the storage.

To facilitate sharing of storage, a concept referred to as "Change Owner" may be used. When a "Change Owner" is executed for a buffer, the responsibility for the storage is passed to a different owner or subsystem. The owner may be, for example, the operating system task or job (address space). An address space or task is a general operating system term used to denote an application, job, program, and/or thread (i.e., any unit of work in an Operating System). If the responsible owner, task, or address space were to terminate abnormally or unexpectedly, then the CSM may free the storage automatically.

This memory-sharing model may be extended to multiple concurrent owners through a concept of primary and image buffers. The storage is not released back to the CSM or the operating system until all users release their ownership, i.e., the primary buffer and the image buffer are both freed. An image buffer may be created from a primary buffer using an "assign buffer" function. Once this function is executed, there are two logical representations for the same storage. A first user may use the primary buffer and a second user may use the image buffer.

The CSM may facilitate sharing and access to buffers through a token. That is, the buffers may be obtained, the buffers may be assigned, the buffers may be freed, the owners may be changed, etc. using the CSM token. Unfortunately, while the CSM may reduce the number of data moves, the relatively complex storage sharing design may make it difficult for an operating system administrator to monitor and evaluate how much storage is being used and what subsystem or software entity is using the storage. Due to the high bandwidth provided by modern technology, it is generally desirable to manage and understand how storage is being used to provide the proper system resources. Unfortunately, it may be difficult for an operating system administrator to determine which jobs or tasks are actually using the CSM storage, determine if CSM is associated with a specific system resource (e.g., I/O device), determine if CSM storage is validly or invalidly growing, plan for and allocate CSM storage, and monitor and track CSM usage with sufficient granularity and understanding.

Another problem that operating system administrators may face is diagnosing a storage growth scenario. Storage may grow excessively due to "lost" buffers when a CSM token representing shared buffers is mismanaged. "Lost" storage or buffers refers to memory that was never freed at all or was not freed the required number of times based on the number of concurrent owners it may have. Storage or buffers may also be lost due to logic errors. Errors that result in "lost" storage may occur very slowly (over a period of days) or may occur very quickly (within microseconds). The errors may result in a complete system outage when the storage growth is excessive. Unfortunately, when these types of errors occur, it may be difficult for an operating system administrator to determine what subsystem or component was last responsible for freeing the storage. Oftentimes only the task or address space ownership is known, which may not provide helpful information.

SUMMARY

According to some embodiments of the present invention, ownership of a memory unit in a data processing system is tracked by assigning an identifier to each software component in the data processing system that can acquire ownership of the memory unit. An ownership variable is updated with the identifier of the software component that acquires ownership of the memory unit whenever the memory unit is acquired.

In other embodiments of the present invention, as the component level ownership variables are dynamically updated, the previous N number of values of the ownership variable are saved to preserve the history of ownership thereby forming an audit trail of ownership.

In other embodiments of the present invention, ownership of a memory unit in a data processing system is tracked by dynamically updating the ownership of the memory unit at a component level having a granularity greater than an operating system task level.

In still other embodiments of the present invention, at least one use label is associated with each of the software components. A use variable is updated with one of the at least one use label associated with the software component that acquires ownership of a memory unit whenever the memory unit is acquired.

In still other embodiments of the present invention, the contents of the ownership variable and/or the use variable for the memory unit are displayed responsive to a user request and/or a failure of one of the software components to acquire the memory unit.

In still other embodiments of the present invention, each of the software components respectively comprises a protocol stack, a layer within a protocol stack, a function, a method, an operating system task, a device driver, and/or an application-programming interface (API).

In still other embodiments of the present invention, the data processing system is managed by the z/OS operating system, which comprises a communications server (CS) subsystem, the CS subsystem comprising a common storage manager (CSM) subsystem.

In still other embodiments of the present invention, the memory unit is associated with the CSM.

Although described primarily above with respect to method aspects of the present invention, it will be understood that the present invention may also be embodied as systems and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
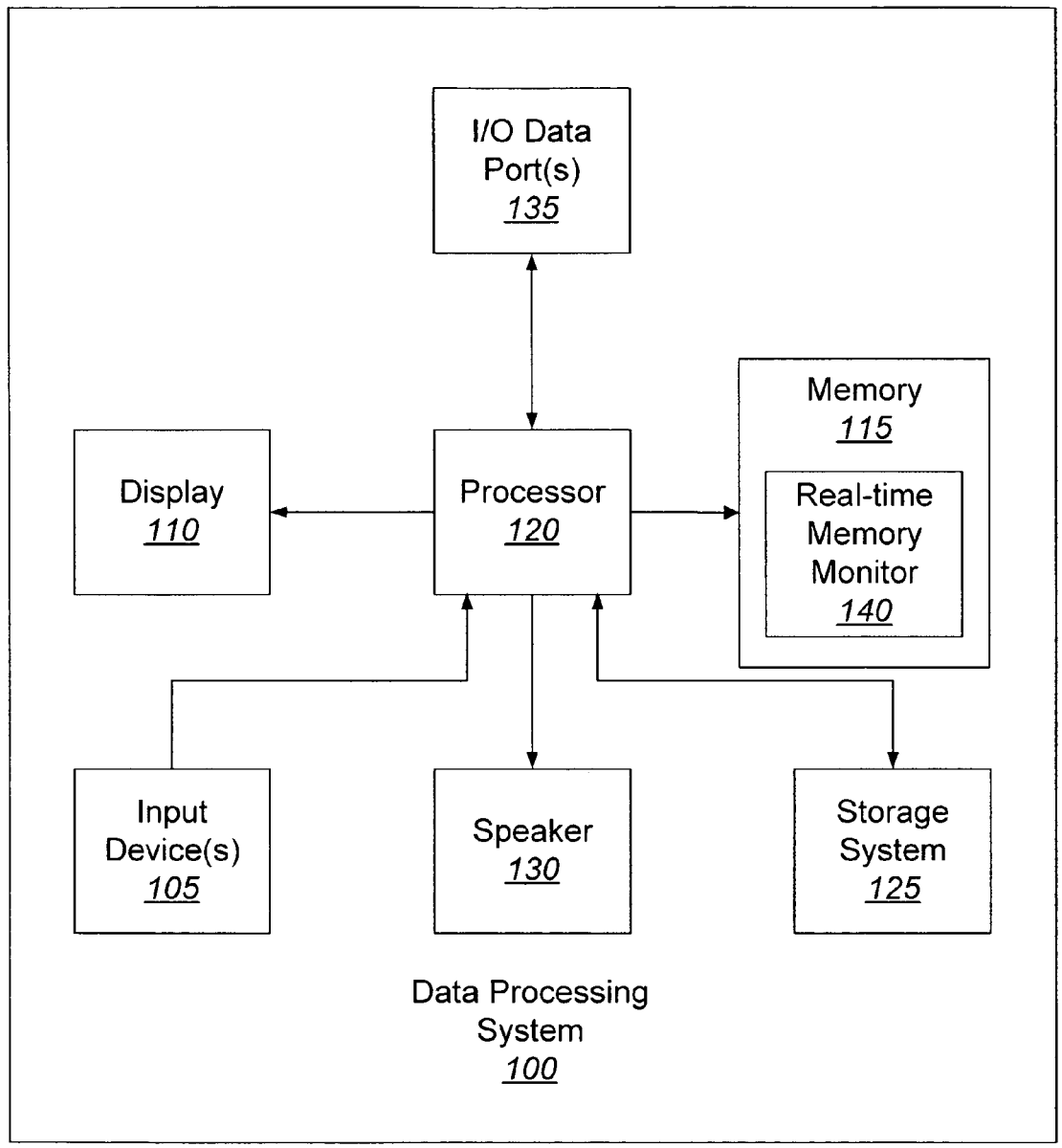
FIG. 1 is a block diagram that illustrates a data processing system in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

FIG. 1 illustrates a data processing system 100 that may include a module for monitoring and/or tracking ownership of one or more memory units therein in accordance with some embodiments of the present invention. The data processing system 100 comprises input device(s) 105, such as a keyboard or keypad, a display 110, and a memory 115 that communicate with a processor 120. The data processing system 100 may further comprise a storage system 125, a speaker 130, and an I/O data port(s) 135 that also communicate with the processor 120. The storage system 125 may include removable and/or fixed media, such as floppy disks, ZIP drives, hard disks, or the like as well as virtual storage such as a RAM-DISK. The I/O data port(s) 135 may be used to transfer information between the data processing system 100 and another computer system or a network (e.g., the Internet). These components may be conventional components, such as those used in many conventional computing devices, and their functionality, with respect to conventional operations, is generally known to those skilled in the art. The memory 115 may be configured with a real-time memory monitor 140 that may be used to track and/or monitor the ownership of one or more memory units, such as buffers, queues, memory segments, and the like, in the data processing system 100.

Figure 2:
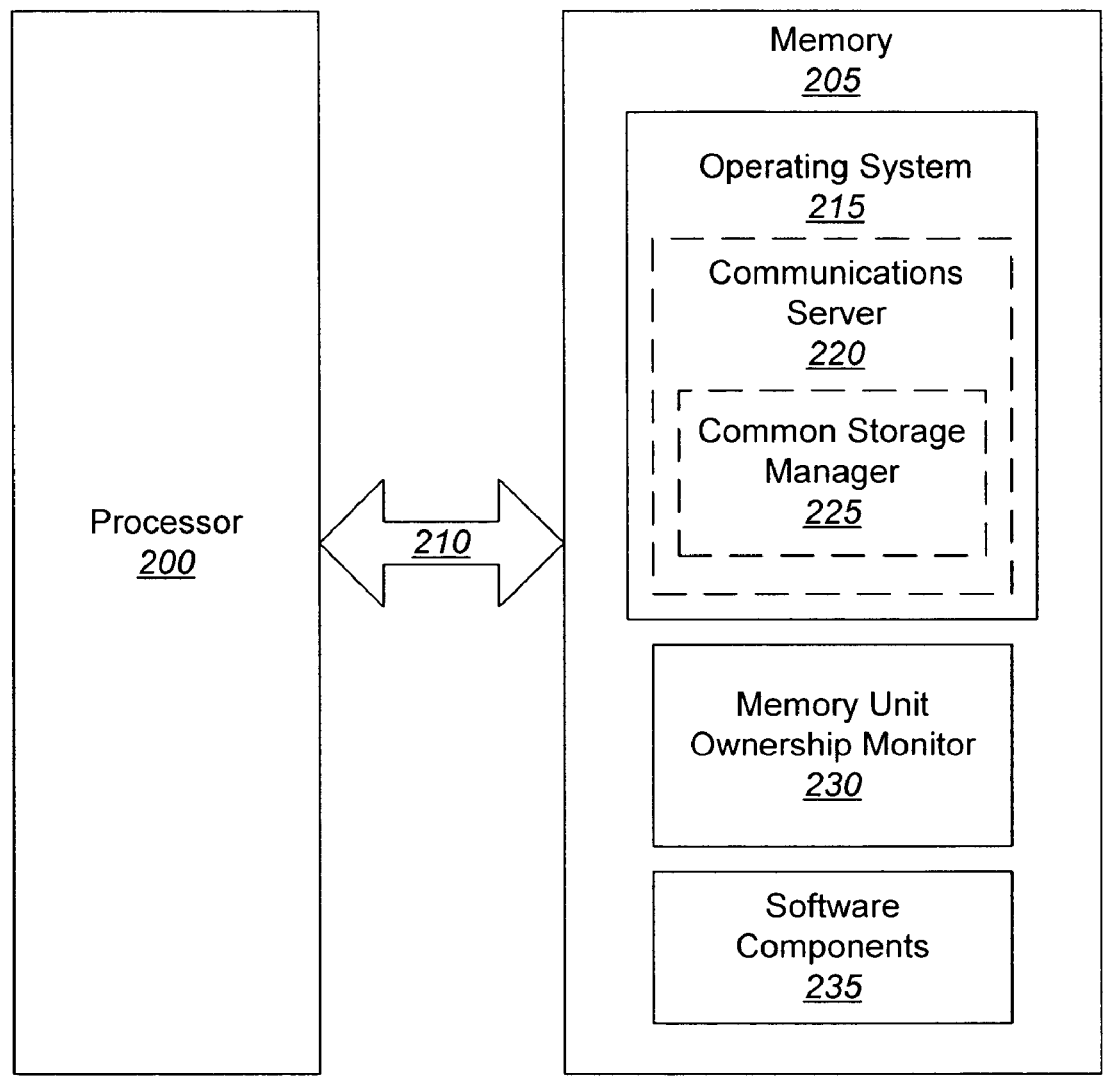
FIG. 2 is a block diagram that illustrates a software/hardware architecture for tracking and/or monitoring ownership of one or more memory units in a data processing system in accordance with some embodiments of the present invention.

FIG. 2 illustrates a processor 200 and memory 205 that may be used in embodiments of data processing systems, such as the data processing system 100 of FIG. 1, in which the ownership of memory units may be monitored in accordance with some embodiments of the present invention. The processor 200 communicates with the memory 205 via an address/data bus 210. The processor 200 may be, for example, a commercially available or custom microprocessor. The memory 205 is representative of the one or more memory devices containing the software and data used for monitoring the ownership of one or more memory units in accordance with some embodiments of the present invention. The memory 205 may include, but is not limited to, the following types of devices: cache, ROM, PROM, EPROM, EEPROM, flash, SRAM, and DRAM.

As shown in FIG. 2, the memory 205 may contain up to three or more categories of software and/or data: an operating system 215, a memory unit ownership monitor 230, and software components 235. The operating system 215 generally controls the operation of the data processing system. In particular, the operating system 215 may manage the data processing system's software and/or hardware resources and may coordinate execution of programs by the processor 200. In accordance with particular embodiments of the present invention, the operating system 215 may be the z/OS operating system, which includes a subsystem called the Communications Server (CS) 220 as discussed above. The CS 220 may include a storage manager subsystem called the Common Storage Manager (CSM) for use by Systems Network Architecture (SNA) and/or TCP/IP protocol stacks to perform input/output (I/O) operations as discussed above.

The memory unit ownership module 230 may be configured to monitor the ownership of one or more memory units by various software components 235 in the data processing system. As described above, the memory units may include, but are not limited to, buffers, queues, memory blocks, and the like. Moreover, the memory unit ownership module 230 may provide an interface through a diagnostic utility, for example, to a user or administrator of the data processing system to allow the user or administrator to review information on ownership of the memory units in the data processing system.

The software components 235 represents the various software entities that may acquire ownership of memory units in the data processing systems. In accordance with various embodiments of the present invention, software components may include, but are not limited to, a protocol stack, a layer within a protocol stack, a function, a method, an operating system task, a device driver, and/or an application programming interface (API).

Although FIG. 2 illustrates exemplary hardware/software architectures that may be used in data processing systems, such as the data processing system 100 of FIG. 1, for monitoring the ownership of memory units in the data processing system, it will be understood that the present invention is not limited to such a configuration but is intended to encompass any configuration capable of carrying out operations described herein. Moreover, the functionality of the data processing system 100 of FIG. 1 and the hardware/software architecture of FIG. 2 may be implemented as a single processor system, a multi-processor system, or even a network of stand-alone computer systems, in accordance with various embodiments of the present invention.

Computer program code for carrying out operations of data processing systems discussed above with respect to FIG. 2 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for detecting the presence of an installation on a data processing system, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
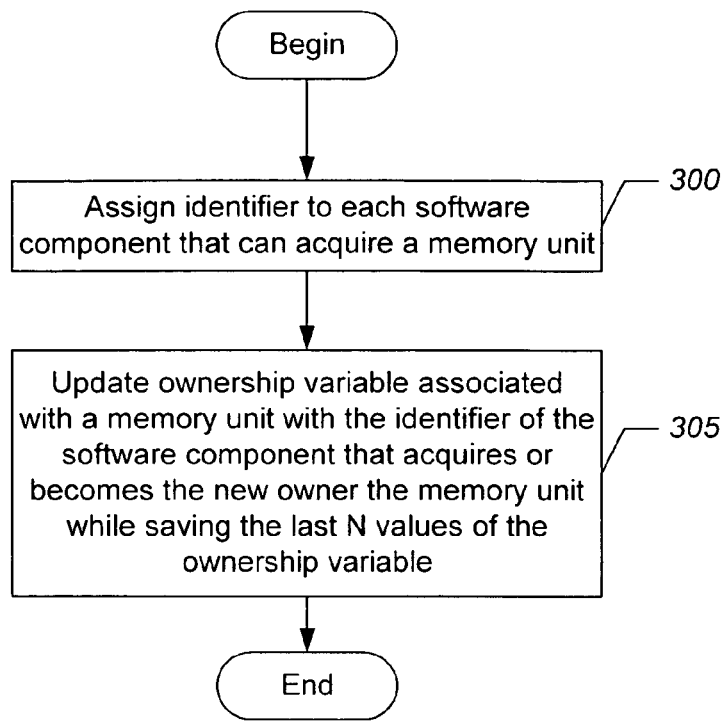
FIGS. 3 and 4 are flowcharts that illustrate operations for tracking and/or monitoring ownership of one or more memory units in a data processing system in accordance with some embodiments of the present invention.

Referring now to FIG. 3, exemplary operations for monitoring ownership of one or more software components 235 in a data processing system begin at block 300 where the memory unit ownership monitor 230 assigns an identifier to each software component that can acquire ownership of a memory unit. At block 305, the memory unit ownership monitor 230 updates an ownership variable associated with a memory unit with the identifier of the software component that acquires the memory unit while optionally saving the previous N number of values of the ownership value so as to form an audit trail of ownership. In some embodiments, the granularity of each of the software components 235 may be greater than that of a software task in the operating system. As discussed above, oftentimes only the address space ownership is known for an owner of a memory unit. As used herein, an address space or task is a general operating system term used to denote an application, job, program, and/or thread (i.e., any unit of work in an Operating System). The memory unit ownership monitor 230 may provide improved granularity for dynamically tracking the ownership of the memory units in the data processing system in real time. As a result, an operating system administrator, for example, may access memory unit ownership information, which may be used to identify system inefficiencies, e.g., "lost" memory units, excessive storage usage, etc. and design flaws in the data processing system.

Figure 4:
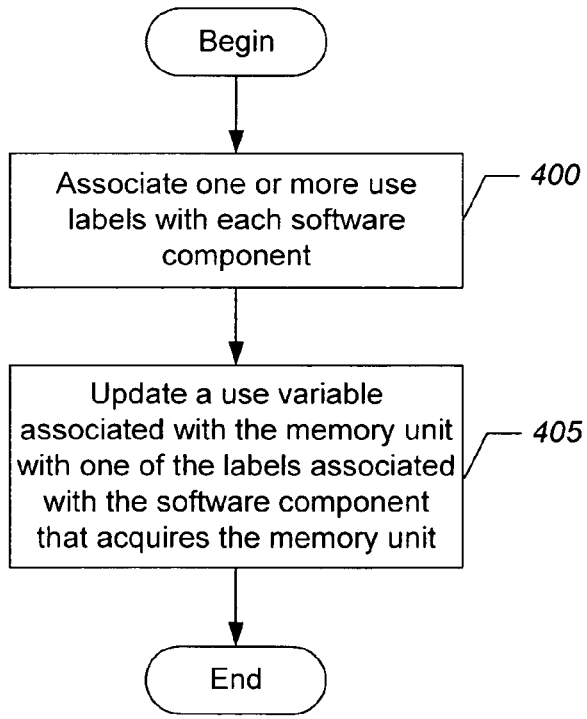

Referring now to FIG. 4, exemplary operations for monitoring ownership of one or more software components 235, in accordance with further embodiments of the present invention, begin at block 400 where the memory unit ownership monitor 230 associates one or more use labels with each software component. At block 405, the memory unit ownership monitor 230 updates a use variable associated with the memory unit with one of the labels associated with the software component that acquires the memory unit. Thus, the use labels may be specific to and have context with respect to the specific software component with which it is associated. For example, if a device driver software component owns a memory unit, it may be helpful to use a label to identify which specific device is using the memory unit. If a TCP layer software component is queueing a memory unit on a specific connection, it may be helpful to use a label to identify the connection, e.g., the address of the connection control block. If a transport layer component is queueing storage on a specific route, then it may be useful to use a label to identify the route information should the route become blocked/congested.

In other embodiments of the present invention, as the component level ownership variables are dynamically updated, the previous N number of ownership variables are saved to preserve the history of ownership thereby forming an audit trail of ownership.

Advantageously, the memory unit ownership monitor 230 may, in accordance with some embodiments of the present invention, display the ownership variable and/or use variable associated with a memory unit in response to a request of an operating system administrator, for example, to assist the administrator in maintaining and/or debugging the memory usage in the data processing system. In further embodiments, the contents of the ownership variable and/or use variable for a memory unit may be displayed upon the failure of one of the software components 235 to acquire the memory unit.

Thus, in contrast to capabilities provided by conventional operating systems in which only the address space may be known for the owner of a particular memory unit, some embodiments of the present invention may provide improved granularity in tracking the ownership of memory units in a data processing system by assigning identifiers to software components at a sufficiently detailed level, e.g., more granular than an operating system task. In addition, some embodiments of the present invention may provide information related to the use of a memory unit via a use variable. This combination more precise ownership identification and use information for a memory unit may assist an operating system administrator in managing memory usage in a data processing system and debugging errors, bottlenecks, etc. when they occur to pinpoint the particular software components associated with the problems.

The flowcharts of FIGS. 3 and 4 illustrate the architecture, functionality, and operations of some embodiments of methods, systems, and computer program products for monitoring and/or tracking ownership of one or more memory units in a data processing system. In this regard, each block represents a module, segment, or portion of code, which comprises one or more executable instructions for implementing the specified logical function(s). It should also be noted that in other implementations, the function(s) noted in the blocks may occur out of the order noted in FIGS. 3 and/or 4. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of tracking ownership of a memory unit in a data processing system, comprising:
    assigning an identifier to each software component in the data processing system that can acquire ownership of the memory unit; and
    updating an ownership variable with the identifier of the software component that acquires ownership of the memory unit whenever the memory unit is acquired.

2. The method of claim 1, wherein updating the ownership variable comprises:
    updating the ownership variable while saving N previous values of the ownership variable.

3. The method of claim 1, further comprising:
    associating at least one use label with each of the software components; and
    updating a use variable with one of the at least one use label associated with the software component that acquires ownership of a memory unit whenever the memory unit is acquired.

4. The method of claim 3, further comprising:
    displaying the contents of the ownership variable and/or the use variable for the memory unit responsive to a user request and/or a failure of one of the software components to acquire the memory unit.

5. The method of claim 1, wherein each of the software components respectively comprises a protocol stack, a layer within a protocol stack, a function, a method, an operating system task, a device driver, and/or an application-programming interface (API).

6. The method of claim 1, wherein the data processing system is managed by an operating system, which comprises a communications server (CS) subsystem, the CS subsystem comprising a common storage manager (CSM) subsystem.

7. A system for tracking ownership of a memory unit in a data processing system, comprising:
    means for assigning an identifier to each software component in the data processing system that can acquire ownership of the memory unit; and
    means for updating an ownership variable with the identifier of the software component that acquires ownership of the memory unit whenever the memory unit is acquired.

8. The system of claim 7, wherein the means for updating the ownership variable comprises:
    means for updating the ownership variable while saving N previous values of the ownership variable.

9. The system of claim 7, further comprising:
    means for associating at least one use label with each of the software components; and
    means for updating a use variable with one of the at least one use label associated with the software component that acquires ownership of a memory unit whenever the memory unit is acquired.

10. The system of claim 9, further comprising:
    means for displaying the contents of the ownership variable and/or the use variable for the memory unit responsive to a user request and/or a failure of one of the software components to acquire the memory unit.

11. The system of claim 7, wherein each of the software components respectively comprises a protocol stack, a layer within a protocol stack, a function, a method, an operating system task, a device driver, and/or an application-programming interface (API).

12. The system of claim 7, wherein the data processing system is managed by an operating system, which comprises a communications server (CS) subsystem, the CS subsystem comprising a common storage manager (CSM) subsystem.

13. A computer program product for tracking ownership of a memory unit in a data processing system, comprising:
    a computer readable storage medium having computer readable program code embodied therein, the computer readable program code comprising:
    computer readable program code configured to assign an identifier to each software component in the data processing system that can acquire ownership of the memory unit; and
    computer readable program code configured to update an ownership variable with the identifier of the software component that acquires ownership of the memory unit whenever the memory unit is acquired.

14. The computer program product of claim 13, wherein the computer readable program code configured to update the ownership variable comprises:
    computer readable program code configured to update the ownership variable while saving N previous values of the ownership variable.

* * * * *